Jan. 30, 1923.
J. LEDWINKA.
CHANNEL STRUCTURE FOR TONNEAU PANELS.
FILED FEB. 27, 1919.
1,443,483.
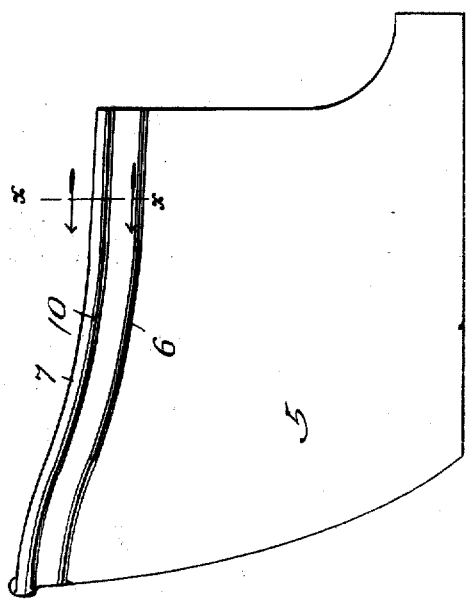
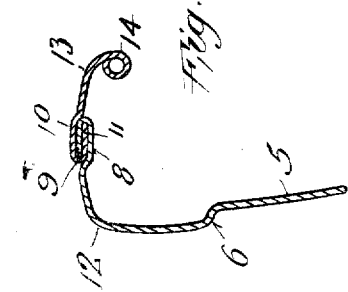
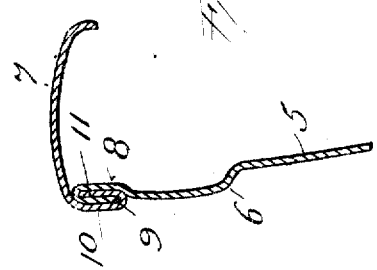
Inventor
Joseph Ledwinka
by his atty Samuel E. Darby Patented Jan. 30, 1923.

1,443,483

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

CHANNEL STRUCTURE FOR TONNEAU PANELS.

Application filed February 27, 1919. Serial No. 279,592.

*To all whom it may concern:*

Be it known that I, JOSEPH LEDWINKA, a citizen of the United States, residing at Philadelphia, in the county of Philadelphia, State of Pennsylvania, have made a certain new and useful invention in Channel Structures for Tonneau Panels (Case E), of which the following is a specification.

This invention relates to channel structures for tonneau panels, and particularly to the structure for channels employed at the upper edge of a tonneau or seat back panel for automobiles.

The object of the invention is to provide a channel structure for the upper edge of a tonneau or seat back panel which is strong and durable, neat and sightly and affords a distinctive finish for such upper edge, and at the same time forming a convenient means for the application and attachment of the upholstery to the panel.

Further objects of the invention will appear more fully hereinafter.

The invention consists substantially in the construction, combination, location, and relative arrangement of parts, all as will be more fully hereinafter set forth, as shown in the accompanying drawing, and finally pointed out in the appended claims.

Fig. 1 is a view in side elevation of an automobile tonneau or seat back panel having a channel structure applied thereto in accordance with my invention.

Fig. 2 is a broken view in vertical section through the upper edge of the panel on the line X, X, Fig. 1.

Fig. 3 is a view similar to Fig. 2 showing a modified structure embodying my invention.

In the drawing reference numeral 5 designates a tonneau or seat back panel for automobiles. This panel may be of any suitable material and may be bent or stamped to any desired shape, style or outline. A sheet steel panel well serves the purpose. At its upper edge the panel 5 is offset outwardly as indicated at 6 although in this respect my invention is not to be limited or restricted. Applied to the edge of the panel is a channel member 7. In the form shown in Fig. 2 this channel member is in the form of a stamping of substantially U-shape in cross section and inverted and one edge of said channel member and the upper edge of the panel are interlocked together. As shown in Fig. 2 this interlocking is accomplished by bending or offsetting the upper edge of the panel inwardly as indicated at 8 and thence outwardly and downwardly as indicated at 9 thereby forming a fold therein. The adjacent edge of the channel member 7 is bent downwardly as at 10 and thence inwardly and upwardly as at 11, the portion 11 extending into the fold formed by the folded over portion 9 of the upper edge of the panel. The several folds or thicknesses of interlocking portions are then suitably secured together by welding or otherwise, thereby forming an efficient lock joint and an exceedingly simple and effective channel structure, the interlocking of the parts being accomplished in substantially the plane of the side of the panel.

In the construction shown in Fig. 3 the interlocking connection between the member 13 and the panel is disposed in the crown of the channel instead of in the plane of the side of the panel. For this purpose the upper edge of the panel, or of the offset portion 6 thereof, where such an offset is formed, is bent inwardly laterally as indicated at 12 to form a portion of the channel, and instead of the additional member 13 which completes the channel formation, being of substantially U-shape in cross section its extreme edge is rolled over upon itself as indicated at 14 for ornamental and strengthening purposes while its outer edge is folded to form the interlocking connection above described with reference to Fig. 2, with the extreme edge of the panel.

The channel formed by the member 7, Fig. 2, or conjointly by the upper bent over edge of the body panel and the additional member 13, Fig. 3, affords means for attaching the upholstery to the panel.

Having now set forth the object and nature of my invention, and a construction embodying the principles thereof, what I claim as new and useful and desire to secure by Letters Patent is:—

1. The combination with a sheet metal panel bent or stamped into the shape and curvature to form the back and sides of a tonneau or seat, of a member curved longitudinally to conform to the curvature and applied to the upper edge of said panel, and forming therewith a channel for attaching the upholstery, the adjacent edges of said panel and member being folded upon each other and interlocked together.

2. The combination with a sheet metal panel bent or stamped into the shape and curvature to form the back and sides of a tonneau or seat, and having an offset portion formed therein adjacent its upper edge, of a member curved longitudinally to conform to the curvature of, and applied to the upper edge of said panel above said offset portion, and forming therewith a channel for attaching the upholstery, the adjacent edges of said member and panel being folded over and upon each other and interlocked together.

3. The combination with a sheet metal panel bent or stamped into the shape and contour to form the back and sides of a tonneau or seat, and having the upper edge thereof bent or folded upon itself, of a member curved longitudinally to conform to the curvature of the panel, and having one edge thereof bent or folded upon itself and interlocking with and secured to the folded over flange portion of the panel, said panel edge and member forming a channel for attaching the upholstery.

4. The combination with a sheet metal panel bent or stamped into shape to form a tonneau or seat, and having the upper edge thereof bent or folded upon itself, of a member cooperating with the edge of the panel to form a channel and having one edge thereof bent or folded upon itself and interlocking with and secured to the folded over flange portion of the panel, and the other edge of said member being rolled into a bead.

5. In an automobile body, the combination with a sheet metal panel shaped to form the sides and back of a seat, of an upholstery receiving and retaining member curved longitudinally to conform to the curvature of the upper edge of said panel, the adjacent portions of said panel and member being folded upon each other to form a lock-joint and rigidly secured together and said member extending laterally from the upper edge of said panel forming an inverted upholstery retaining channel at the upper edge thereof.

In testimony whereof I have hereunto set my hand on this 24th day of February A. D. 1919.

JOSEPH LEDWINKA.